United States Patent [19]

Broughton

[11] 4,310,902
[45] Jan. 12, 1982

[54] INFORMATION STORAGE ARRANGEMENTS

[75] Inventor: Philip Broughton, Bolton, England

[73] Assignee: International Computers Limited, London, England

[21] Appl. No.: 141,790

[22] Filed: Apr. 21, 1980

[30] Foreign Application Priority Data

May 9, 1979 [GB] United Kingdom ............... 16020/79

[51] Int. Cl.³ ............................................. G11C 11/40
[52] U.S. Cl. .................................... 365/218; 365/222
[58] Field of Search ................. 365/174, 149, 218, 222

[56] References Cited

U.S. PATENT DOCUMENTS 3,675,218  7/1972  Sechler ............................... 365/222
3,737,879  6/1973  Greene et al. ....................... 365/222

Primary Examiner—Terrell W. Fears
Attorney, Agent, or Firm—Lee, Smith & Jager

[57] ABSTRACT

An information storage arrangement comprising two random access memories. While one memory is being used for normal read/write access, the other is automatically cycled through so that each location can be reset. When a "reset" command is received, the roles of the two memories are interchanged, so that the one which has just been reset is now used for normal read/write access. This provides a very rapid reset facility. The invention is of particular use for storing validity marker bits for data items in a slave store.

5 Claims, 3 Drawing Figures

INFORMATION STORAGE ARRANGEMENTS

BACKGROUND OF THE INVENTION

This invention relates to information storage arrangements.

In data processing, information is often stored in a random access memory (RAM) having a plurality of locations which can be addressed individually, one location at a time. It may be necessary from time to time to reset the RAM to a predetermined state (e.g. to set every location to "0"). This generally has to be done by sequencing through each location in turn and resetting it to the required state. However, this clearly takes a long time, especially if there is a large number of locations in the RAM, and this may result in an unacceptable delay in the operation of the system.

The object of the present invention is to overcome this problem.

SUMMARY OF THE INVENTION

According to the present invention, an information storage arrangement comprises:

(a) at least two random access memories each of which contains a plurality of individually addressable locations;

(b) means for indicating which one of the memories is currently in use and for causing all read/write accesses to the storage system to be directed to that memory;

(c) means for automatically sequencing through the memory currently not in use and resetting the contents of that memory to a predetermined value, concurrently with any read/write accesses to the memory currently in use; and (d) means responsive to a "reset" command for switching the indicating means so that the memory currently not in use becomes the memory currently in use and vice versa.

Thus, resetting of one of the memories is overlapped with the read/write operation of the other. The "reset" command simply involves interchanging the roles of the two memories so as to substitute the memory which has just been reset for the one currently in use. The command can therefore be performed very rapidly.

An arrangement in accordance with the invention may contain only two such memories which are alternated so that when one memory is in use the other is being reset. However, it may sometimes be desirable to increase the degree of overlapping by providing three or more memories, so that while one memory is in use two or more other memories are being reset. This effectively allows more time for resetting the memories and may therefore be useful in situations where the "reset" commands occur very frequently.

An information storage arrangement in accordance with the invention is particularly applicable to the storage of validity markers for data items in a data store (e.g. a slave store in a hierarchical data storage system).

The data store may have associated with it a plurality of information storage arrangements in accordance with the invention for storing validity markers for data of different types. This makes it possible to selectively clear data of a particular type, as will be explained later.

BRIEF DESCRIPTION OF DRAWINGS

One embodiment of the invention will now be described by way of example with reference to the accompanying drawings of which FIGS. 2 and 3 show the validity marker arrangement in detail.

DESCRIPTION OF THE PREFERRED EMBODIMENT

Figure 1:
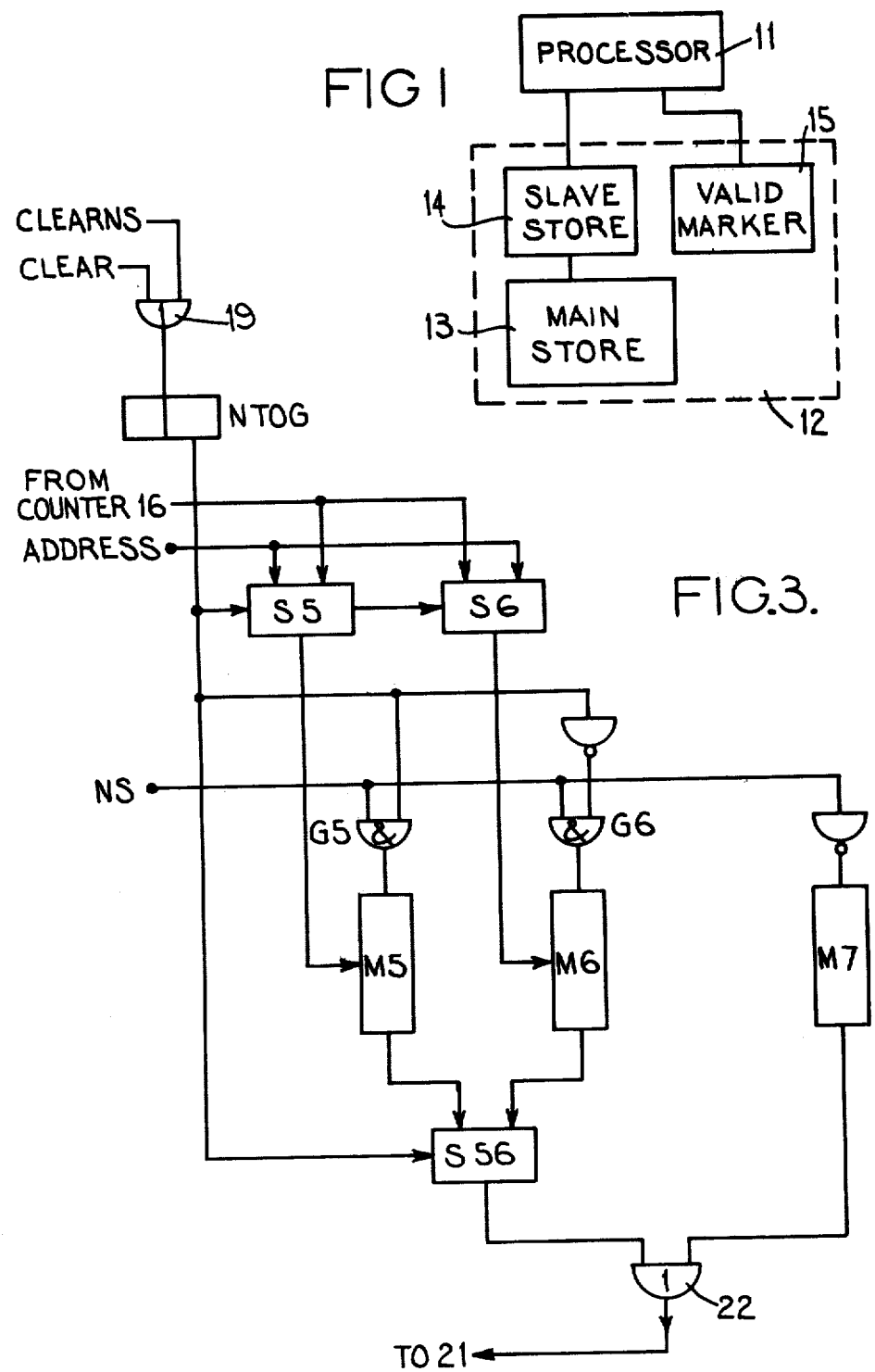
FIG. 1 is an overall block diagram of a data processing system including a hierarchial storage system with a validity marker arrangement.

Referring to FIG. 1, the data processing system comprises a central processing unit 11 and a storage system 12. The storage system comprises a main store 13 (holding, for example, 64K data items) and a slave store 14 (holding 1K=1024 data items). The slave store is therefore substantially smaller than the main store, but has a considerably faster access time. The slave store serves to hold copies of data items which are in current use by the processing unit 11, so that they can be accessed with minimum delay. In operation, whenever the processing unit 11 requires to read a data item, it applies the address of that item to the storage system 12. The storage system first checks whether the item is present in the slave store 14. If so, the item is retreived immediately. However, it the item is not present, a main store access must be initiated to fetch the item and place it in the slave store.

Such two-level storage hierarchies are well known in the art and details will not be described here since they form no part of the present invention.

The slave store has a validity marker arrangement 15 associated with it. This provides the processing unit 11 with an indication of whether the currently addressed data item in the slave store is a valid copy of the main store.

It will be appreciated that, with such a validity marker arrangement, in order to clear a data item from the slave store it is necessary only to reset its validity marker to indicate that the item is invalid. This has the same effect as if the item had been actually physically deleted from the slave store, but is considerably more convenient.

Using the validity marker arrangement, it is possible to clear the slave store completely, by resetting all the validity markers. Alternatively, it is possible to clear the store partially by selectively clearing data items of one of the following types:

(a) Local data, i.e. data which belongs to a particular process or processes, as opposed to public data which is available to all the processes in the system. Such local data should preferably be cleared whenever the process to which it belongs terminates.

(b) non-slavable data, i.e. data which is being written into an area of storage by a first process so that it can later be read by a second process. In such a case, unless the second process is ready to run immediately, it is not worthwhile retaining a copy of the data in the slave when the first process terminates, and such data should therefore preferably be cleared, at that time. Non slavable data may be either public or local.

To permit such partial clearing, the validity marker arrangement contains separate sets of validity markers for public, local and non-slavable data. Thus, for example, local data can be selectively cleared by resetting the local validity markers only.

Clearing of the slave is controlled by three signals from the processing unit:

CLEAR: clear the slave completely.
CLEARL: clear local data.
CLEARNS: clear non-slavable data.

Figure 2:
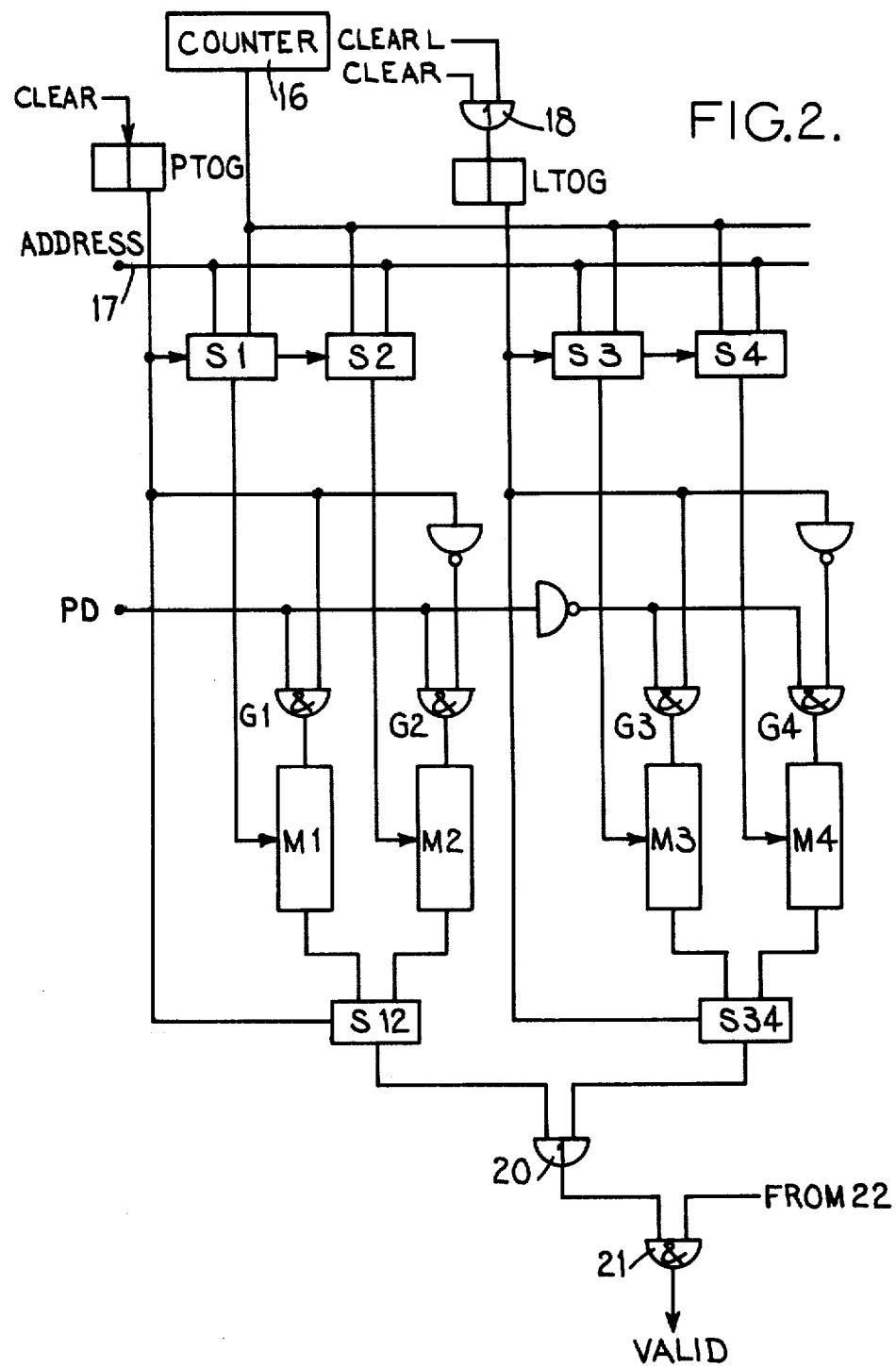

Referring now to FIGS. 2 and 3, the validity marker arrangement comprises seven RAMs M1–M7. Each of these RAMs contains 1K individually addressable bits, one for each location of the slave store.

Referring to FIG. 2, the first pair of RAMs M1, M2 is used to store validity bits for public data. This pair has a bistable circuit PTOG associated with it, for indicating which of this pair is currently in use: when PTOG is set (PTOG=1), M1 is currently in use, and when PTOG is unset (PTOG=0), M2 is currently in use. The bistable PTOG has a "toggle" action; i.e. whenever a pulse is applied to its clock input, it changes to its opposite state.

The output signal from PTOG controls a pair of selector circuits S1, S2 each of which receives the 10-bit slave store address on line 17 and the output of a 10-bit counter 16. The outputs of the selector circuits S1, S2 are applied to the address inputs of M1 and M2 respectively.

Thus, when PTOG=1, M1 is addressed by the slave store address and M2 by the counter 16. Conversely, when PTOG=0, M1 is addressed by the counter 16 and M2 by the slave store address.

The data inputs of M1 and M2 are connected to the outputs of a pair of AND gates G1, G2 both of which receive a control signal PD, which indicates whether the data item currently being written into the slave is a valid public data item. Gate G1 is enabled by the output of PTOG and gate G2 is enabled by its inverse. Hence, when PTOG=1, M1 receives the signal PD as data input while M2 receives "0". Conversely, when PTOG=0, M1 receive "0" while M2 receives the signal PD.

The data outputs of M1 and M2 are applied to a selector circuit S12 which is controlled by PTOG, the output of M1 being selected when PTOG=1 and the output of M2 being selected when PTOG=0.

Thus, it can be seen that at any given time, one or other of the RAMs M1, M2 is selected to act as the validity bit store for public data, and all read or write operations on the validity bits are directed to the selected RAM. Meanwhile, the currently non-selected RAM is addressed by the counter 16 and has a "0" applied to its data input. Hence, as the counter sequences through the addresses of the non-selected RAM, each bit is reset to zero.

It can also be seen that public data can be cleared simply by clocking the bistable PTOG. This causes the roles of the RAMs M1, M2 to be interchanged so that the RAM which has just been reset becomes the one now in current use. PTOG is clocked by the control signal CLEAR. Public data is therefore cleared only when complete clearance of the slave is requested. The second pair of RAMs M3, M4 is used to store validity bits for local data. This pair has a toggle-action bistable LTOG associated with it, for determining which of the pair is currently in use. LTOG controls selectors S3, S4 and S34 similar in function to S1, S2 and S12. LTOG also controls two AND gates G3 and G4 which feed inputs of M3 and M4. These gates G3, G4 receive the inverse of the signal PD, which is "1" whenever a local (i.e. non-public) data item is written into the slave.

Operation of the RAMs M3, M4 is therefore similar to that of M1, M2: at any given time, one of the pair is in current use, while the other is being sequenced through by the counter 16 and reset to zero. Local data can be cleared simply by clocking the bistable LTOG so as to interchange the roles of M3 and M4. The clock input of LTOG is derived from an OR gate 18 which receives the control signals CLEAR and CLEARL. Local data is therefore cleared when complete clearance of data is requested, or when selective clearance of local data is requested.

Referring now to FIG. 3, the third pair or RAMs M5, M6 is used to store validity bits for non-slavable data. This pair has a toggle action bistable NTOG associated with it, for determining which of the pair is currently in use. NTOG controls selectors S5, S6 and S56 similar in function to S1, S2 and S12. NTOG also controls two AND gates G5 and G6 which feed the data inputs of M5 and M6. These gates receive a control signal NS which indicates whether the data item currently being written into the slave is a valid non-slavable data item.

Operation of the RAMs M5, M6 is therefore similar to that of M1, M2: at any given time one of the pair is in current use while the other is being sequenced through by the counter 16 and reset to zero. Non-slavable data can be cleared simply by clocking the bistable NTOG so as to interchange the roles of M5 and M6. The clock input of NTOG is derived from an OR gate 19 which receives the control signals CLEAR and CLEARNS. Non-slavable data is therefore cleared when complete clearance of data is requested, or when selective clearance of non-slavable data is requested.

The control signal NS is also applied, after inversion, to the data input of RAM M7, which is addressed directly by the slave store address on path 17. Thus, M7 remembers the locations of items in the slave (whether valid or invalid) which are not non-slavable data. The purpose of this RAM will become apparent shortly.

Referring again to FIG. 2, the output of the selection circuits S12 and S34 are combined in an OR gate 20. The output of the OR gate therefore indicates that the currently addressed data item has either its public validity bit or its local validity bit set. However, this is not sufficient to show whether the data item is actually valid, since it may be a non-slavable data item which has been selectively cleared by interchanging M5 and M6.

Therefore, to produce a VALID signal, the output of the OR gate 20 is combined in an AND gate 21 with the output of an OR gate 22 (FIG. 3) which receives the outputs of selector S56 and of the RAM M7. Thus, if the item is not a non-slavable item (i.e. the output of M7=1), the VALID signal is determined solely by the OR function of the public and local validity bits of that item. However, if the item is a non-slavable item (i.e. the output of M7=0), the VALID signal is determined by the AND function of the non-slavable validity bits with the OR function of the public and local validity bits.

In a modification of the validity marker arrangement described above, each pair of RAMs M1/M2, M3/M4 and M5/M6 may be replaced by a set of three or more RAMs, the bistables PTOG, LTOG and NTOG replaced by devices having three or more states (e.g. shift registers), and the two-way selectors S1 etc. replaced by three (or more) way selectors. The system is arranged to operate in such a manner that one RAM of each set is in current use, while the other two (or more) RAMs are being reset. When it is desired to clear the slave, the RAM which is currently in use is interchanged with one of the "stand-by" RAMs and clearing of the newly out-of-use RAM commences. It will be appreciated that such a system allows more time for clearing each individual RAM, since the clearing of each RAM is overlapped with the use of two or more other RAMs.

I claim:

1. An information storage arrangement comprising
   (a) at least two random access memories each having its own address input and its own data input and output;
   (b) means for indicating which memory is currently in use and which is currently not in use;
   (c) an address path
   (d) a counter
   (e) first switching means, controlled by the indicating means, for connecting the address path to the address input of the memory which is currently in use and connecting the counter to the address input of the memory which is currently not in use;
   (f) second switching means, controlled by the indicating means, for feeding an input data signal to the data input of the memory which is currently in use and for feeding a predetermined value to the data input of the memory which is currently not in use;
   (g) third switching means, controlled by the indicating means, for reading an output data signal from the data output of the memory which is currently in use; and
   (h) means responsive to a "reset" command for switching the indicating means so that the memory currently not in use becomes the memory currently in use and vice versa.

2. An information storage system comprising
   (a) a data store having a plurality of individually addressable locations; in combination with
   (b) an information storage arrangement in accordance with claim 1, wherein the locations in each of said random access memories provide validity markers for respective locations of the data store; and
   (c) means responsive to the writing of a valid data item into one of the locations of the data store, for setting the corresponding validity marker of the memory which is currently in use.

3. An information storage system comprising
   (a) a data store having a plurality of individually addressable locations, in combination with
   (b) first and second information storage arrangements in accordance with claim 1, wherein the locations of each of said random access memories in each of said arrangements provide validity markers for respective locations of the data store;
   (c) means responsive to the writing of a valid data item of a first category into one of the locations of the data store, for setting the corresponding validity marker of the memory which is currently in use in the first arrangement; and
   (d) means responsive to the writing of a valid data item of a second category into one of the locations of the data store, for setting the corresponding validity marker of the memory which is currently in use in the second arrangement.

4. An information storage system according to claim 3 further including an OR gate for combining the outputs of the two storage arrangements to provide an indication that a valid data item of either said first or second category is present in the data store.

5. An information storage system according to claim 3 wherein said first and second categories of data are public and local data.

* * * * *